United States Patent
Wu et al.

(10) Patent No.: US 12,017,937 B2
(45) Date of Patent: Jun. 25, 2024

(54) ROTATIONAL FLOW ROTATION DEOILING METHOD AND DEVICE FOR OIL-BASED MUD ROCK DEBRIS

(71) Applicants: Shanghai Huachang Environmental Protection Co., Ltd, Shanghai (CN); Sichuan University, Sichuan (CN); EAST CHINA UNIVERSITY OF SCIENCE AND TECHNOLOGY, Shanghai (CN)

(72) Inventors: Jiwei Wu, Shanghai (CN); Hualin Wang, Shanghai (CN); Jiake Pan, Shanghai (CN); Xia Jiang, Shanghai (CN); Lixiang Wang, Shanghai (CN); Yuan Huang, Shanghai (CN); Jianping Li, Shanghai (CN); Pengbo Fu, Shanghai (CN); Wenjie Lv, Shanghai (CN)

(73) Assignees: Shanghai Huachang Environmental Protection Co., Ltd., Shanghai (CN); Sichuan University, Sichuan (CN); East China University of Science and Technology, Shanghai (CN)

( * ) Notice: Subject to any disclaimer, the term of this patent is extended or adjusted under 35 U.S.C. 154(b) by 657 days.

(21) Appl. No.: 17/275,234

(22) PCT Filed: Dec. 5, 2018

(86) PCT No.: PCT/CN2018/119278
§ 371 (c)(1),
(2) Date: Mar. 11, 2021

(87) PCT Pub. No.: WO2020/052109
PCT Pub. Date: Mar. 19, 2020

(65) Prior Publication Data
US 2022/0041486 A1 Feb. 10, 2022

(30) Foreign Application Priority Data
Sep. 12, 2018 (CN) .......................... 201811061667.7

(51) Int. Cl.
C02F 11/127 (2019.01)
C02F 11/13 (2019.01)
E21B 21/06 (2006.01)

(52) U.S. Cl.
CPC .......... *C02F 11/127* (2013.01); *E21B 21/063* (2013.01); *C02F 11/13* (2019.01)

(58) Field of Classification Search
CPC ........ F26B 21/063; C02F 11/127; C02F 11/13
(Continued)

(56) References Cited

U.S. PATENT DOCUMENTS

| 1,598,256 A | * | 8/1926 | Prutzman | ................. B01J 20/10 |
| | | | | 502/410 |
| RE21,686 E | * | 1/1941 | Smith | ........................ F26B 5/04 |
| | | | | 34/79 |

(Continued)

FOREIGN PATENT DOCUMENTS

| CA | 2979651 A1 | * | 3/2019 | .......... B01J 19/0013 |
| CA | 3112482 A1 | * | 3/2020 | .............. C02F 11/00 |

(Continued)

OTHER PUBLICATIONS

International Search Report in corresponding PCT Patent Application No. PCT/CN2018/119278, dated Jun. 12, 2019.
(Continued)

*Primary Examiner* — Stephen M Gravini
(74) *Attorney, Agent, or Firm* — Melissa Hunter-Ensor; Nathan Hsu; Greenberg Traurig, LLP (57) ABSTRACT

Disclosed is a rotational flow rotation deoiling method for oil-based mud rock debris. The method comprises the fol-
(Continued)

lowing steps: (1) System viscosity control, wherein by means of heat exchange between a gas medium and the rock debris, the viscosity of the oil-based mud debris is reduced to reduce the interaction force between oil, water, and the surface and channels of solid particles, thereby facilitating the separation in a rotational flow field; (2) Rotational flow rotation deoiling, wherein the oil-based mud rock debris particles undergo a coupled motion of rotation and revolution, wherein by means of the rotation of the rock debris particles, the centrifugal desorption of oil on the surface of a solid phase, oil in capillaries and oil in pores is enhanced; and by means of the centrifugal force of periodic oscillation generated by the revolution thereof, the separation and enrichment of oil and gas and the solid phase are completed, thereby achieving the removal of the oil phase from the pore channels of the rock debris; and (3) gas-liquid separation and reuse, wherein an oil-containing mixture produced in step (2) is subjected to gas-liquid separation so as to realize the reuse of a base oil, circulation of the gas medium, and a harmless treatment of the rock debris; and a rotational flow rotation deoiling device for oil-based mud rock debris is further comprised.

9 Claims, 3 Drawing Sheets

(58) Field of Classification Search
USPC .......................................................... 34/58
See application file for complete search history.

(56) References Cited

U.S. PATENT DOCUMENTS

| | | | | |
|---|---|---|---|---|
| 3,449,602 | A * | 6/1969 | Hals | H02K 44/08 310/11 |
| 4,725,362 | A * | 2/1988 | Dugat | F23G 7/05 210/769 |
| 7,867,399 | B2 * | 1/2011 | Jones | E21B 21/063 210/708 |
| 7,935,261 | B2 * | 5/2011 | Jones | E21B 21/063 210/708 |
| 8,758,629 | B2 | 6/2014 | Soane et al. | |
| 9,675,354 | B2 | 6/2017 | Weir et al. | |
| 9,729,973 | B2 | 8/2017 | Paget et al. | |
| 11,578,248 | B2 * | 2/2023 | Santos | C09K 8/28 |
| 11,655,409 | B2 * | 5/2023 | AlGhunaimi | B01J 41/04 166/305.1 |
| 2013/0288935 | A1 * | 10/2013 | Rehage | C09K 8/90 510/238 |
| 2020/0056097 | A1 * | 2/2020 | Chang | B01D 17/0214 |
| 2022/0041486 | A1 * | 2/2022 | Wu | E21B 21/063 |
| 2022/0396493 | A1 * | 12/2022 | Cox | C01F 11/185 |

FOREIGN PATENT DOCUMENTS

| | | | | |
|---|---|---|---|---|
| CN | 1691991 | A | 11/2005 | |
| CN | 103643910 | A | 3/2014 | |
| CN | 103736360 | A | 4/2014 | |
| CN | 103758474 | A | 4/2014 | |
| CN | 103773408 | A | 5/2014 | |
| CN | 102698815 | B | 6/2014 | |
| CN | 104178200 | A | 12/2014 | |
| CN | 104692607 | A | 6/2015 | |
| CN | 106746417 | A | 5/2017 | |
| CN | 109052881 | A * | 12/2018 | ............ C02F 11/00 |
| CN | 109052903 | A | 12/2018 | |
| CN | 106007284 | B | 1/2019 | |
| CN | 109184600 | A | 1/2019 | |
| CN | 109184601 | A | 1/2019 | |
| CN | 109267953 | A | 1/2019 | |
| CN | 106630504 | B | 7/2019 | |
| CN | 107597201 | B | 10/2019 | |
| KR | 2023121710 | A * | 8/2023 | |
| WO | 2000/49269 | A1 | 8/2000 | |
| WO | WO-2020052109 | A1 * | 3/2020 | ............ C02F 11/00 |

OTHER PUBLICATIONS

Li et al. 'The Enhancement on the Waste Management of Spent Hydrotreating Catalysts for Residue Oil by a Hydrothermal-Hydrocyclone Process'. Catalysis Today, Aug. 1, 2016, vol. 271, pp. 163-171.

Mac-Acquaye et al. 'Solutions for Management of Oil on Drilled Cuttings in the New Deepwater Oil Province of Ghana.' SPE African Health, Safety, Security, Environment, and Social Responsibility Conference and Exhibition, 2016, OnePetro.

Pond et al. 'Processing and Recycling Drill Cuttings at Source—Technology and Services Adhering to Zero Discharge Legislation'. Day 4 Thu, Nov. 16, 2017, No. D041S106R002 (13 pages).

Wu et al. 'Cyclone Oil Desorption Technology for the Disposal of Oil-Based Mud Cuttings.' SPE Journal, Dec. 15, 2021, vol. 26, No. 6, pp. 3561-3574.

Fang et al., "Odor-Treatment Technology for Recovered Hydrocarbons From Oily Waste in a Thermal-Desorption Unit," Oil and Gas Facilities, Dec. 2016, vol. 5, Paper No. SPE-184399-PA, pp. 1-5.

* cited by examiner

ROTATIONAL FLOW ROTATION DEOILING METHOD AND DEVICE FOR OIL-BASED MUD ROCK DEBRIS

CROSS REFERENCE TO RELATED APPLICATIONS

This application is a U.S. National Phase application under 35 U.S.C. 371 of International Application No. PCT/CN2018/119278, filed Dec. 5, 2018, which claims priority to and the benefit of CN Application No. 201811061667.7 filed Sep. 12, 2018, the entire disclosure of each of which is incorporated herein by reference.

TECHNICAL FIELD

The present disclosure pertains to the field of green treatment of oil-containing solid waste from shale gas drilling, and in particular relates to a method and an apparatus for deep deoiling by cyclone rotation of oil-based mud cuttings, so as to achieve harmless treatment of the waste oil-based mud cuttings generated in the mining of shale gas. Specifically, the present disclosure provides a method and an apparatus for deep deoiling by cyclone rotation of oil-based mud cuttings.

BACKGROUND

Oil-based mud is widely used for shale gas drilling because of its various advantages in protecting shale gas reservoirs, increasing drilling speed, effectively preventing well wall collapse, etc. The three-stage section and the horizontal section of a shale gas well are usually more than 1500 m long, and a large amount of oil-containing cuttings is generated (about 250-500 m³ in a single well). The oil content of oil-based mud cuttings is about 10%-30%. It has been included in the "National Catalog of Hazardous Wastes" (2016) under the "sludge produced by treatment of waste mud" from crude oil and natural gas mining. The waste category is HW08 waste mineral oil, and the waste code is 071-001-08. If it is not treated to be harmless, it will pollute the soil, water and air in the surroundings.

The main goal of treating oil-based mud cuttings is to achieve harmless treatment of the waste. The most important technical indicator is the oil content in the treated waste. The treatment is essentially removal of oil. At present, the main technologies used to treat waste oil-based mud cuttings include: high-temperature incineration, chemical extraction technology, and thermal desorption technology (thermal phase separation).

The high temperature incineration does not provide a high degree of resource utilization of waste oil-based mud, and the transportation cost and risk are high. Chinese Patent Application CN 201610863875.3 discloses a method for treating solid residue in waste oil-based mud. The method uses a process including vibratory screening—drying—fluidized bed incineration—dust removal—SCR (selective catalytic reduction) denitrification—bi-alkali desulfurization. The solid residue in the waste oil-based mud is made completely harmless. However, the whole set of process equipment is complicated, occupies a large area, operates at high cost, and provides a low oil recovery rate. Moreover, the gas generated in the process tends to lead to secondary pollution.

Chinese Patents For Invention ZL 201310645168.3, ZL 201410033209.8, ZL 201410033980.5, and ZL 201410033210.0 relate to the processes and apparatus for treating waste oil-based mud or drill cuttings and recovering the oil and the waste oil-based mud with the use of the LRET technology (resource recovery technology for waste oil-based mud detritus). The LRET technology adopts an ambient temperature deep desorption and recovery process, including centrifugal filtration, centrifugal sedimentation, ambient temperature deep desorption with a chemical agent, a distillation and condensation process, and a process of recycling the chemical agent. This technology can realize continuous recovery of the mud, mud additive, weighting agent and chemical agent (99%) at ambient temperature and pressure. However, its processing efficiency is greatly affected by the composition of the waste oil-based mud, and the high price of the chemical agent leads to higher operating cost. U.S. Pat. No. 8,758,629 relates to a similar chemical extraction method, wherein an environmentally benign extractant is used to extract the oil contained in drill cuttings, and then an oleophilic absorber is used to absorb the oil-dissolved extractant, followed by addition of a certain amount of an aqueous solution of potassium chloride to separate the drill cuttings and the absorber, thereby achieving the goal of removing oil from drill cuttings. The advantage of this method is that the extractant used is environmentally friendly and harmless, and the used absorber can be regenerated and reused. However, the long treatment cycle limits the treatment output. After shaking and extracting for 7.5 minutes and standing still for 96 hours, the total petroleum hydrocarbon content in the drill cuttings can only be reduced to 0.6%, failing to meet the treatment standard.

In recent years, the thermal desorption technology has become a means that has been tried the most frequently around the world to treat waste oil-based mud cuttings due to its advantages such as no need to add a treatment agent and thorough deoiling. Chinese Patent For Invention ZL 201410397190.5 relates to a thermal desorption treatment method that mainly utilizes the heat generated by friction to directly heat oil-based drill cuttings to remove oil. At the same time, this technology is also used to treat waste oil-based mud cuttings as reported in SPE-188222-MS (Processing and Recycling Drill Cuttings at Source-Technology and Services Adhering to Zero Discharge Legislation), SPE-183600-MS (Solutions for Management of Oil on Drilled Cuttings in the New Deepwater Oil Province of Ghana) and the like. In addition, this technology has also been developed and used by Halliburton and MI Swaco (a subsidiary of Schlumberger), which are well-known international oil service companies. U.S. Pat. Nos. 9,729,973 and 9,675,354 to Halliburton relate to methods and apparatus for recovering base oil from waste mud. According to these methods, drill cuttings are heated by friction, so that the oil and water in the drill cuttings are gasified and then condensed and recovered. The advantage of these methods is that the oil is gasified at a temperature lower than the boiling point of the oil under atmospheric pressure, thereby achieving the purpose of reducing energy consumption. The disadvantage is that these methods can only be used to treat a subject with a low solid content, because the mud with a high solid content tends to wear the equipment severely. Chinese Patent Applications For Invention CN 201610547026.7 and CN 201710056325.5 disclose thermal desorption treatment methods that utilize indirect heating with high-temperature flue gas. At the same time, in SPE-184399-PA (Odor-Treatment Technology for Recovered Hydrocarbons From Oily Waste in a Thermal-Desorption Unit), Jereh Environmental Technology Co., Ltd. reported the field application of similar technologies. Since 2014, the use of a thermal desorption treatment apparatus developed by US NOV Company for indirect heating of heat transfer oil has been tried in Sinopec Sichuan Fuling Shale Gas Field for harmless treatment of the waste oil-based mud cuttings generated on site. However, no matter direct heating or indirect heating is employed in a thermal desorption technology, there have always been problems in engineering applications such as high energy consumption, serious exhaust gas pollution, high temperature destruction of a mud system, and only partial recovery of base oil, etc.

Chinese Patent Application For Invention CN 201210147625.1 relates to a method and an apparatus for treating a catalyst discharged from fluidized bed residue oil hydrogenation. The method is based on the hydrothermal cyclone desorption technology, including three process steps: (1) adjustment and control of viscosity reduction, (2) separation by cyclone desorption, and (3) separation of oil-water-catalyst phases and resource utilization. The flow shear force of the rotating flow field is used to desorb and separate the adsorbed oil from solid particle surfaces and internal pores. The use of the hydrothermal cyclone desorption technology for removing oil from a discharged catalyst is also reported by Jian-Ping Li (The enhancement on the waste management of spent hydrotreating catalysts for residue oil by a hydrothermal-hydrocyclone process, Catalysis Today, 271 (2016), 163-171). Chinese Patent Application CN201710821746.2 discloses a method and an apparatus for treating, sorting and reusing an oil-containing discharged catalyst. The following process steps are conducted to desorb the oil phase from the catalyst and sort the catalyst: (A) cyclone washing and on-line activation of the discharged catalyst, (B) stripping of the catalyst by cyclone rotation to remove the solvent, (C) gas flow acceleration sorting of the high-activity catalyst, (D) cyclone re-stripping of the high-activity catalyst and particle trapping, and (E) gas cooling and solvent condensation removal, desorption and separation of the oil phase of the catalyst. The above technologies all make use of the high flow shear force in the cyclone separator and the high-speed rotation of the catalyst particles to promote the desorption process of the oil in the pores of the catalyst particles. However, the above methods and apparatus are only directed to the oil removal treatment and reuse of the discharged catalysts. Although they meet the requirements of catalyst treatment, reduce environmental pollution caused by petroleum pollutants, and recover part of the oil phase and catalysts, the oil content of the solid phase after the treatment is still greater than 1%. The oil content of the solid phase treated by the hydrothermal cyclone desorption technology is even higher than 5%. Hence, the requirement of harmless treatment of waste oil-based mud that the mineral oil in the solid phase should be less than 0.3% cannot be satisfied.

Now that the existing waste oil-based mud treatment technologies generally have problems such as high energy consumption, serious secondary pollution, and high treatment cost, while the existing cyclone de-oiling technologies cannot meet the requirements of harmless treatment of waste oil-based mud, there is an urgent need in the prior art to develop a method and an apparatus for treating waste oil-based mud cuttings with a simple process in an efficient, environmentally friendly, and energy-saving way, so as to achieve the goal of harmless treatment of waste oil-based mud cuttings.

SUMMARY

The present disclosure provides a novel method and a novel apparatus for deep deoiling of oil-based mud cuttings by cyclone rotation, thereby solving the problems existing in the prior art.

The technical problem to be solved by the present disclosure is that the existing technologies for treating waste oil-based mud cuttings have difficulties in efficiently separating the oil entrapped in the pores of the cuttings particles, and they also have high costs, complicated processes, and an inclination to produce secondary pollution. According to the present disclosure, the coupled motion of the rotation and revolution of the cuttings particles in the three-dimensional rotating turbulent flow field is utilized to promote the centrifugal desorption of solid surface oil, capillary oil and pore oil, so as to accomplish the separation and enrichment of the oil, gas and solid phase, thereby achieving deep removal of organic matters from waste oil-based mud cuttings.

In one aspect, the present disclosure provides a method for deoiling of oil-based mud cuttings by cyclone rotation, comprising the following steps:

(1) Control of system viscosity: reducing viscosity of oil-based mud cuttings by heat exchange between a gas medium and the cuttings to reduce interaction force of oil and water with solid particle surfaces and pores, thereby facilitating separation in a cyclone field;

(2) Cyclone rotation deoiling: among a coupled motion of rotation and revolution of oil-based mud cuttings particles in the cyclone field, using the rotation of the cuttings particles to promote centrifugal desorption of solid surface oil, capillary oil and pore oil, and using a periodically oscillating centrifugal force generated by the revolution to accomplish separation and enrichment of oil, gas and solid phases, thereby achieving removal of the oil phase from the pores of the cuttings; and (3) Gas-liquid separation and reuse: performing gas-liquid separation on the oil-containing mixture produced in step (2) to realize reuse of base oil, circulation of the gas media, and harmless treatment of the cuttings.

In a preferred embodiment, in step (1), the control of the system viscosity is carried out in the cyclone field, wherein a turbulent flow field in the cyclone field is utilized to promote heat exchange efficiency between the gas medium and the waste oil-based mud cuttings, so as to raise liquid temperature, thereby achieving the purpose of reducing the viscosity.

In another preferred embodiment, in step (1), the control of the viscosity is carried out at an operating temperature ranging from 70° C. to 200° C., depending on the formulation of the waste oil-based mud, and lower than the rated use temperature of the waste oil-based mud.

In another preferred embodiment, in step (1), the gas medium includes air, nitrogen, supercritical carbon dioxide gas, hydrogen, dry gas, gas from a low pressure separator, and tail gas from natural gas combustion.

In another preferred embodiment, in step (2), the oil-based mud cuttings particles have the coupled motion of cyclone revolution and particle rotation in the cyclone field; the rotation has a speed of at most 5000 revolutions/second; and a residence time is 2-10 seconds.

In another aspect, the present disclosure provides an apparatus for deoiling of oil-based mud cuttings by cyclone rotation, comprising:

a gas feeding system and a gas heating system connected to the gas feeding system for heating a gas medium;

a cyclone separator set connected to the gas heating system for deoiling of waste oil-based mud cuttings by cyclone rotation; and a gas-liquid separation and reuse system connected to the cyclone separator set for separating, circulating and reusing an oil-containing mixture exiting an overflow port of the cyclone.

In a preferred embodiment, the apparatus further comprises: a conveying system connected to the gas heating system for conveying the waste oil-based mud cuttings to be treated; a conveying system connected to the cyclone separator set for conveying the waste oil-based mud cuttings which have been treated; and a cuttings tank connected to the conveying system for storing the waste oil-based mud cuttings which have been treated.

In another preferred embodiment, the cyclone separator set is a combination of 1-10 cyclone separators in series, and can be connected in parallel in multiple stages depending on treatment load.

In another preferred embodiment, the cyclone separator set is assembled by installing the cyclone separator(s) in a normal arrangement, installing the cyclone separator(s) in an inverted arrangement, or installing the cyclone separators in a combination of a normal arrangement and an inverted arrangement.

Beneficial Effects

The main advantages of the method and apparatus of the invention include:

(i) The removal of capillary oil, surface oil and pore oil is promoted by the centrifugal force generated by the high-speed rotation of the waste oil-based mud cuttings in the cyclone field.

(ii) The separation and enrichment of the oil, gas and solid phases are accomplished with the aid of the periodically oscillating centrifugal force generated by the revolution.

(iii) Because the rotation speed of the cuttings particles in the cyclone field can be up to tens of thousands of revolutions per minute, the resulting centrifugal force can fully remove the oil phase from the nano- to micro-scale pores of the cuttings, so as to increase the deoiling efficiency and reduce energy consumption.

BRIEF DESCRIPTION OF THE DRAWINGS

The accompanying drawings are provided for further understanding of the disclosure. They constitute a part of the specification only for further explanation of the disclosure without limiting the disclosure.

DETAILED DESCRIPTION

After extensive and intensive research, the inventors of the present application have reached the following findings: because shale is very dense with an extremely low porosity (from 2% to 4%) and an extremely poor permeability (from 0.0001 mD to 0.1 mD), it's difficult for the pore oil in the waste oil-based mud cuttings particles to leave the nano- to micro-scale pores; on the other hand, the waste oil-based mud cuttings particles have a rotation speed of up to 5000 revolutions per second in a cyclone field, whereby a centrifugal force greater than viscous resistance can be provided, so as to promote the removal of the pore oil; at the same time, the cyclone rotation process is short in time, and the temperature required for heating to reduce viscosity is also lower than that required by a traditional process, thereby effectively increasing the treatment efficiency and reducing the energy consumption.

Based on the above research and findings, the inventors have creatively developed a method and an apparatus for efficient deoiling of waste oil-based mud with a driving gas. The advantages include simple process, easy operation, high deoiling efficiency, low energy consumption, etc., and the problems in the existing technologies have been solved effectively. The oil content of the cuttings treated according to the present disclosure is as low as 0.16% or less, about half of the maximum allowable content (0.3%) of mineral oil in GB4284-84 "Control standards for pollutants in sludges from agricultural use". The residence time of the cuttings in the cyclone separator set is less than 5 s, so the treatment time is much shorter than that of a conventional treatment method. Therefore, harmless treatment of oil-based mud cuttings with high efficiency and low consumption is achieved.

In one aspect according to the present disclosure, there is provided a method for deep deoiling of oil-based mud cuttings by cyclone rotation, comprising the following steps:

(1) Control of system viscosity: reducing viscosity of oil-based mud cuttings by heat exchange between a gas medium and the cuttings to reduce interaction force of oil and water with solid particle surfaces and pores, thereby facilitating separation in a cyclone separator set;

(2) Cyclone rotation deoiling: among a coupled motion of rotation and revolution of oil-based mud cutting particles in the cyclone separator set, using the high-speed rotation of the cutting particles to promote centrifugal desorption of solid surface oil, capillary oil and pore oil, and using a periodically oscillating centrifugal force generated by the revolution to accomplish separation and enrichment of oil, gas and solid phases, thereby achieving deep removal of the oil phase from the pores of the cuttings; and (3) Gas-liquid separation and reuse: performing gas-liquid separation on the oil-containing mixture produced in step (2) to realize reuse of base oil, circulation of the gas media, and harmless treatment of the cuttings.

In the present disclosure, the control of the system viscosity in step (1) is carried out in the cyclone field, wherein a high-speed turbulent flow field in the cyclone field is utilized to promote heat exchange efficiency between the gas medium and the waste oil-based mud cuttings, so as to raise liquid temperature, thereby achieving the purpose of reducing the viscosity.

In this present disclosure, the operating temperature for the control of the system viscosity in step (1) needs to be appropriately selected according to different waste oil-based mud formulations. In principle, it should be lower than the rated use temperature of the waste oil-based mud, and the temperature generally ranges from 70° C. to 200° C. Within this range, the oil phase of the waste oil-based mud will not be cracked.

In the present disclosure, in the deoiling process with the aid of the high-speed rotation caused by the cyclone in step (2), the motion of the oil-based mud cuttings in the cyclone field is a coupled motion of cyclone revolution and particle rotation. The rotation speed is up to 5000 revolutions per second, and the residence time is 2 to 10 seconds.

In the present disclosure, the gas medium used for driving oil with cyclonic gas is air, nitrogen, (supercritical) carbon dioxide gas, hydrogen, dry gas, gas from a low pressure separator, tail gas from natural gas combustion, etc.

In a second aspect of the present disclosure, there is provided an apparatus for deep deoiling of oil-based mud cuttings by cyclone rotation, comprising: a gas feeding system, a gas heating system, a cyclone separator set, a gas-liquid separation and reuse system, a conveying system and a cuttings tank, wherein:

the gas feeding system and the gas heating system are used to heat the gas medium;

the cyclone separator set is used for deep deoiling of the waste oil-based mud cuttings under high-speed rotation caused by the cyclone;

the gas-liquid separation and reuse system is used to separate, circulate and reuse the oil-containing tail gas exiting the overflow port of the cyclone separator; and the conveying system and the cuttings tank are used to convey and store the waste oil-based mud cuttings before and after the treatment.

In the present disclosure, the cyclone separator set is a combination of 1-10 cyclone separators in series, and can be connected in parallel in multiple stages depending on the treatment load.

In the present disclosure, the cyclone separator set is assembled by installing the cyclone separator(s) in a normal arrangement, installing the cyclone separator(s) in an inverted arrangement, or installing the cyclone separators in a combination of a normal arrangement and an inverted arrangement.

Reference will be now made to the accompanying drawings.

Figure 1:
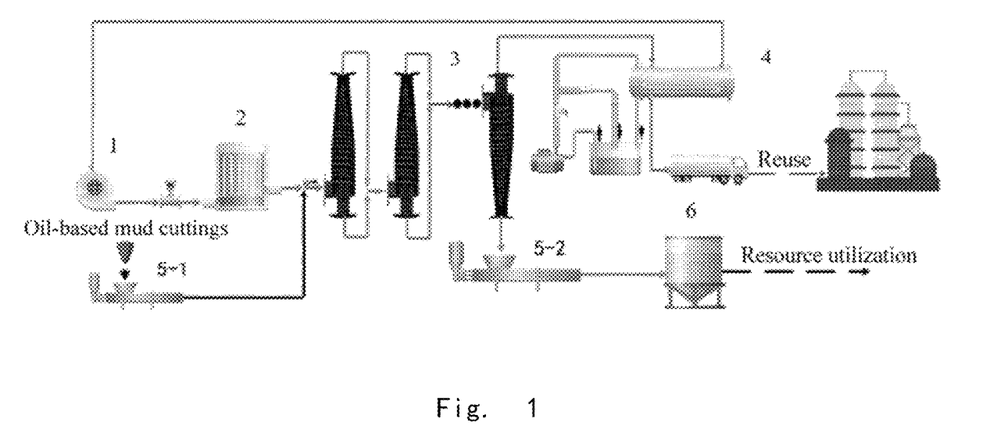
FIG. 1 shows a process flow of the method for deep deoiling of oil-based mud cuttings by cyclone rotation according to a preferred embodiment of the present invention.

FIG. 1 shows a process flow of the method for deep deoiling of oil-based mud cuttings by cyclone rotation according to a preferred embodiment of the present invention. As shown by FIG. 1, a gas medium enters a gas heating system 2 from a gas feeding system 1. After the gas medium is heated, it is mixed with the waste oil-based mud cuttings input from a first conveying system 5-1, and the resulting mixture enters a cyclone separator set 3. The cyclone velocity field in the cyclone separator set 3 can increase the turbulence of the gas. The increased turbulence promotes convective heat transfer between the gas medium and the waste oil-based mud cuttings particles, and thus helps reduce the viscosity of the waste oil-based mud cuttings, thereby facilitating dispersion of the particles and removal of the oil phase. At the same time, the periodically oscillating centrifugal force generated by the revolution of the cuttings particles in the cyclone field is utilized to remove the free oil and part of the capillary oil, and the centrifugal force generated by the high-speed rotation is utilized to remove the capillary oil, surface oil and pore oil, so as to achieve deep deoiling of the waste oil-based mud cuttings. The waste oil-based mud cuttings particles that have been deeply deoiled are discharged from the bottom outflow port of the last stage of the cyclone separator set 3, and sent to a cuttings tank 6 by a second conveying system 5-2 for resource utilization, for example, paving a road at a well site, burning bricks, etc. The liquid phase (composed of oil, water, etc.) obtained by the deoiling enters a gas-liquid separation and reuse system 4 along with the gas medium. The gas medium returns to the gas feeding system 1 for circulation, and the liquid phase is transported by tanker to a mud station for reuse, thereby achieving harmless treatment of the waste oil-based mud cuttings and maximizing reuse of the resources.

EXAMPLES

The invention will be further illustrated with reference to the following specific Examples. It is nevertheless to be appreciated that these Examples are only intended to exemplify the invention without limiting the scope of the invention. The test methods in the following examples for which no specific conditions are indicated will be carried out generally under conventional conditions or under those conditions suggested by the manufacturers. Unless otherwise specified, all parts are parts by weight, and all percentages are percentages by weight.

Example 1

For oil-based mud drilling in a shale gas area, the waste oil-based mud was deoiled using the method and apparatus according to the present disclosure. The specific operation process and effects are described as follows:

1. Measurement of the Physical and Chemical Properties of an Oil-Based Mud Cuttings Sample 1) Measurement of the Contents of the Oil, Water and Solid Phases A Soxhlet extractor and a $CCl_4$ solvent were used to extract the waste oil-based mud cuttings. The oil content of the sample was 19.4% as measured by an infrared spectrophotometer. After drying, the solid content of the sample was 63.1%, and the water content was 17.5%.

2) Measurement of the Particle Size of the Cuttings Particles

Figure 2:
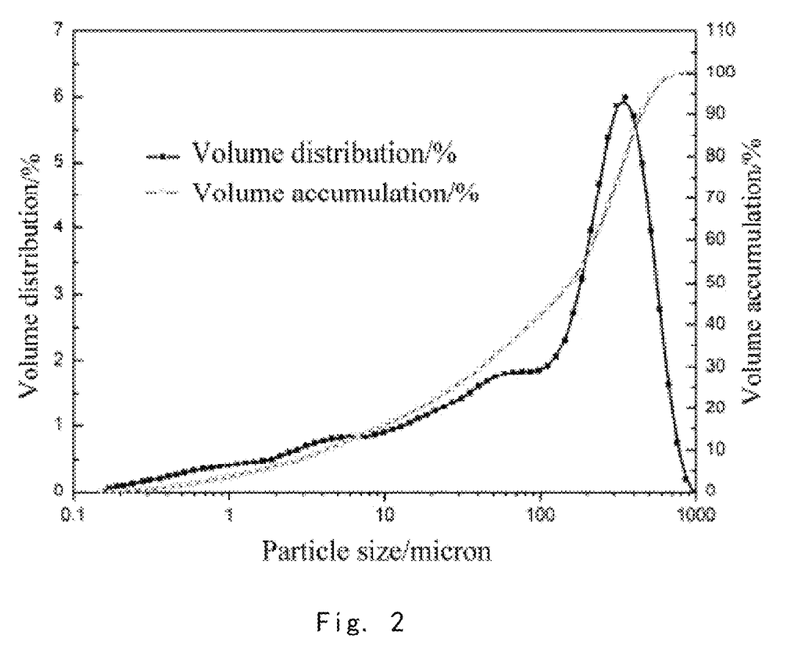
FIG. 2 shows particle size distributions of the waste oil-based mud cuttings particles used in an embodiment of the present invention.

The particle size of the cuttings particles has a direct influence on the magnitude of the centrifugal force applied on the cuttings particles in the cyclone separator. The particle size distribution of the extracted cuttings particles measured by a laser particle size analyzer is shown by FIG. 2. The particle size distribution ranged from 0.15 μm to 976.48 μm; the average diameter was 202.73 μm; the median diameter was 163.49 μm; and the standard deviation was 226.63 μm.

3) Measurement of Nitrogen Adsorption

Figure 3:
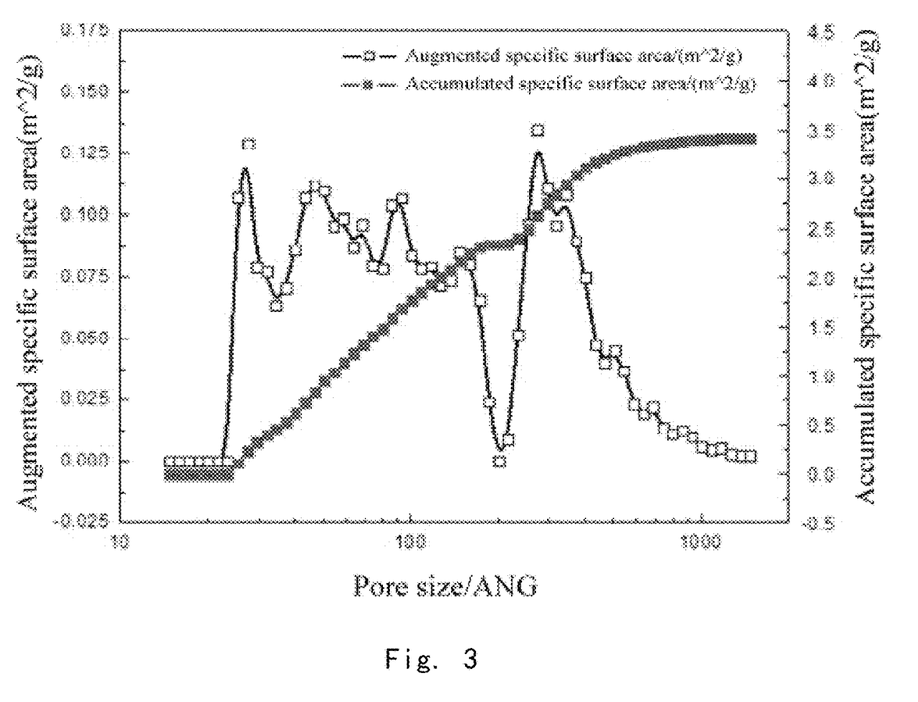
FIG. 3 shows mesopore distributions of the waste oil-based mud cuttings particles used in an embodiment of the present invention.
Figure 4:
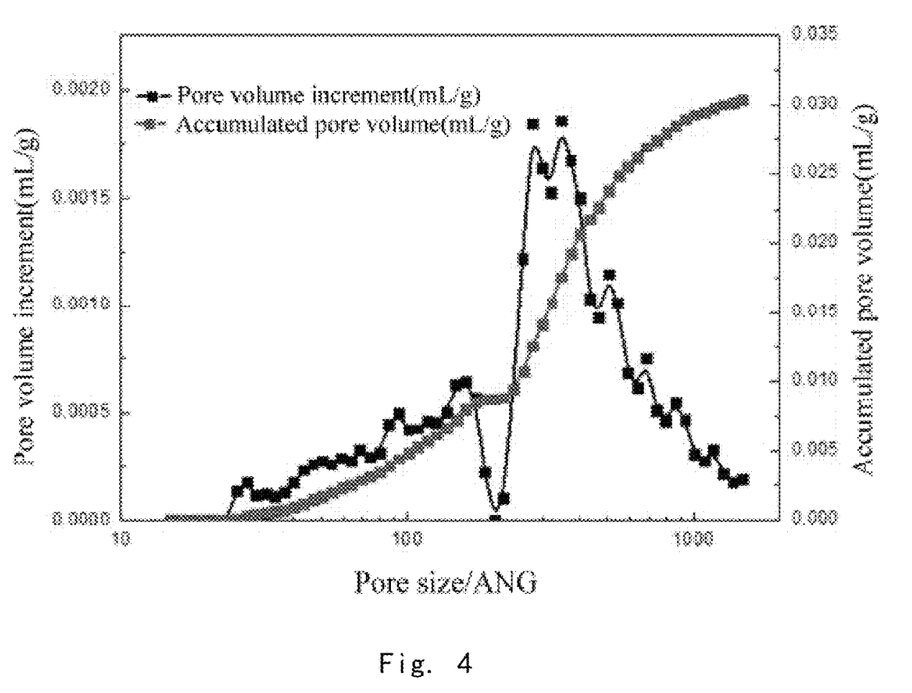
FIG. 4 shows surface area distributions of the waste oil-based mud cuttings particles used in an embodiment of the present invention.

The specific surface area and pore volume of the extracted oil-based drill cuttings particles were measured with an automatic nitrogen adsorption instrument. As shown by FIGS. 3-4, the average surface area of the particles was 9.43 $m^2/g$; the average pore volume was 0.0372 $cm^3/g$, and the average pore size was 163.47 μm. FIGS. 3-4 show that the oil-based drill cuttings particles were porous systems with irregular surface morphology. The cuttings pores were mainly in the mesoporous range, so deoiling was very difficult.

4) Measurement of Viscosity-Temperature Curve

Figure 5:
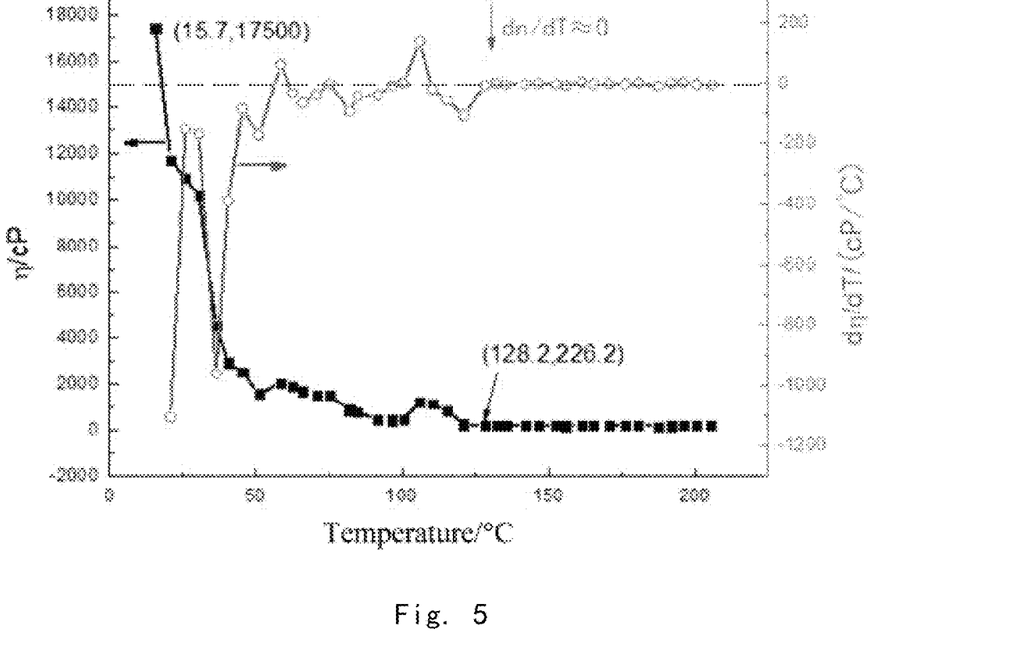
FIG. 5 shows viscosity-temperature curves of the waste oil-based mud used in an embodiment of the present invention.

A rotor viscometer was used to determine the variation of the dynamic viscosity of the waste oil-based mud liquid sample during the heating process. As shown by FIG. 5, after the sample was heated to 128° C., the viscosity had little change when the heating continued. At this point, the dynamic viscosity of the sample had decreased from 17500 cP (centipoise) at the initial temperature to 226 cP, a decrease of about 80 times. The test results show that heating of the waste oil-based mud can effectively reduce its viscosity, and the selection of the temperature of the heating gas medium is guided.

2. Implementation Process

In this Example, air was selected as the gas medium. The air was heated by an air duct electric heater. A screw conveyor was used for material transportation.

The air was pumped in by an air feeding system at 200 m³/h and heated to 160° C. by a gas heating system. Oil-based mud drill cuttings were transported by a conveying system at a feed rate of 50 kg/h. The gas and solid phases entered a cyclone separator set for deep deoiling treatment. The treated solid phase entered a cuttings tank, and the rest of the material entered a gas-liquid separation and reuse system. A sampling port was provided at the bottom outflow port of each stage of the cyclone separator set for sample analysis.

3. Implementation Effects

1) Deoiling Effect

Figure 6:
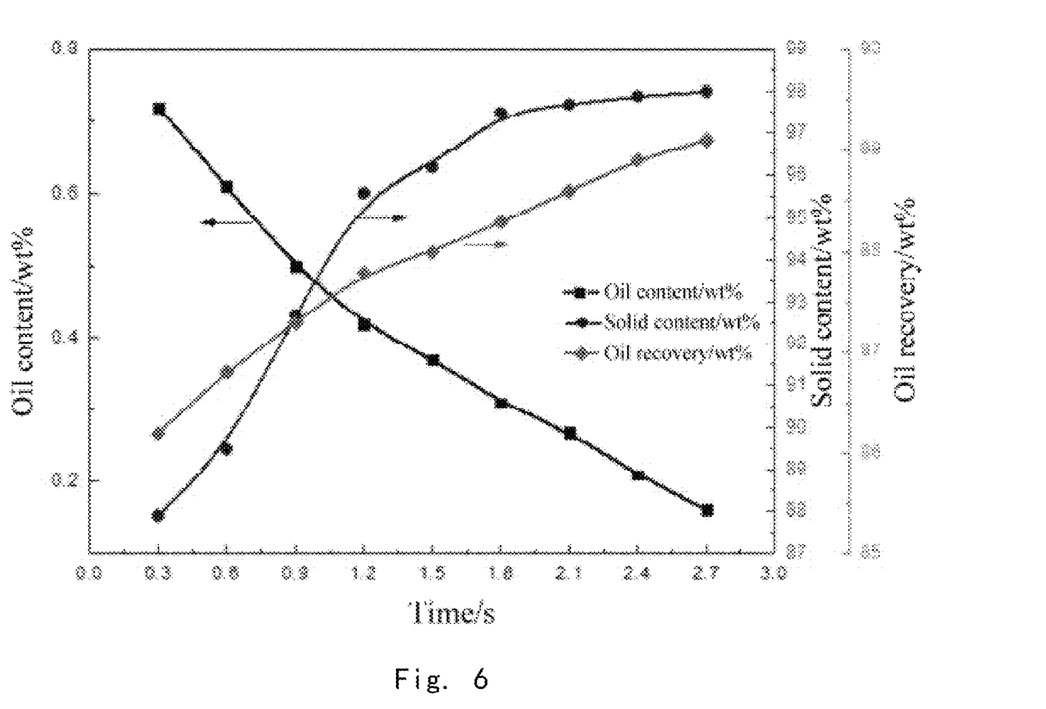
FIG. 6 shows the deep deoiling effect of an oil-based mud cyclone separator according to an embodiment of the present invention.

Upon theoretical calculation, the calculated residence time of the cuttings particles in the cyclone separator was used as the cyclone rotation deoiling treatment time, and the calculation result was that the residence time of each stage was about 0.3 s. The Soxhlet extraction-infrared spectroscopy method was used to measure the oil content of the drill cutting particles from the bottom outflow port of the cyclone separator at each stage, and the deoiling efficiency of each stage relative to the starting material was calculated. As shown by FIG. 6, after treatment for 2.7 s, the oil content of the drill cuttings particles was 0.16%, far lower than the oil content of less than 0.3% required by GB 4284-84 "Control standards for pollutants in sludges from agricultural use", and the deoiling efficiency reached 99.2%.

2) Properties of the Recovered Mud

The recovered oil-based mud was sampled from the gas-liquid separation and reuse system, and its property parameters were measured as shown in Table 1. As known from the results, the recovered oil-based mud met the requirements for reformulation and reuse of oil-based mud.

TABLE 1

Property parameters of recovered oil-based mud

| Parameter/unit | Measured Value |
|---|---|
| Density/(g/cm³) | 1.40-1.62 |
| Funnel viscosity/s | 50-90 |
| API (American Petroleum Institute) filtration (static filtration)/mL | ≤2 |
| Basicity (Pom)/mL | 1.2-2.5 |
| Gel strength/Pa | 4-6/10-12 |
| Sand content/% | ≤1 |
| Plastic viscosity/MPa · s | 20-35 |
| Yield point/Pa | 10-25 |
| Solid content/% | 15-20 |
| HTHP (high temperature and high pressure) filtration (high temperature and high pressure filtration) | ≤3 |
| MBT (bentonite content)/(g/L) | 10-20 |
| $K_f$ (friction coefficient) | <0.10 |
| Emulsion-breaking voltage/V | 762 |
| Undissolved lime/(kg/m³) | 2-9 |
| $CaCl_2$ content in aqueous phase/wt % | 20-30 |
| Oil/water ratio | 70-80/20-30 |

3) Estimation of Energy Consumed by the Apparatus

Based on the energy consumed in the test process, the energy consumed by an industrial apparatus with an annual treatment capacity of 84000 tons was estimated. The energy consumed by the main electrical devices is shown in Table 2 below:

TABLE 2

Energy consumed by the devices

| No. | Device | Voltage/V | Number of devices Operating | Number of devices Spare | Power/kW | Operating hours per year/h | Annual electricity consumption/×1000 kWh |
|---|---|---|---|---|---|---|---|
| 1 | Screw conveyor (feeding) | 380 | 1 | — | 4 | 8400 | 33.6 |
| 2 | Screw conveyor (transporting) | 380 | 1 | — | 2 | 8400 | 16.8 |
| 3 | Screw conveyor (discharging) | 380 | 1 | — | 1 | 8400 | 8.4 |
| 4 | Air blower | 380 | 1 | 1 | 200 | 8400 | 1680 |
| 5 | Air duct electric heater | 380 | 1 | — | 1000 | 8400 | 8400 |
| | Total | | | | 1207 | | 10138.8 |

The total annual energy consumption is equivalent to 871.78 tons of standard oil, and the energy consumption of the treatment of waste oil-based mud cuttings is 10.38 kg/t standard oil.

In summary, the implementation of this technology can effectively reduce the running cost of the process, save resources, protect environment, and meet the strategic direction towards "low carbon, green, efficient, energy saving" sustainable development.

The Examples listed above are only preferred examples in the disclosure, and they are not intended to limit the scope of the disclosure. Equivalent variations and modifications according to the disclosure in the scope of the present application for invention all fall in the technical scope of the disclosure.

All of the documents mentioned in the disclosure are incorporated herein by reference, as if each of them were incorporated herein individually by reference. It is to be further understood that various changes or modifications to the disclosure can be made by those skilled in the art after reading the above teachings of the disclosure, and these equivalent variations fall in the scope defined by the accompanying claims of the application as well.

What is claimed is:

1. A method for deoiling of oil-based mud cuttings by cyclone rotation, comprising
    (1) Control of system viscosity: reducing viscosity of oil-based mud cuttings by heat exchange between a gas medium and the cuttings to reduce interaction force of oil and water with solid particle surfaces and pores, thereby facilitating separation in a cyclone field;
    (2) Cyclone rotation deoiling: among a coupled motion of rotation and revolution of oil-based mud cuttings particles in the cyclone field, using the rotation of the cuttings particles to promote centrifugal desorption of solid surface oil, capillary oil and pore oil, and using a periodically oscillating centrifugal force generated by the revolution to accomplish separation and enrichment of oil, gas and solid phases, thereby achieving removal of an oil phase from the pores of the cuttings; and
    (3) Gas-liquid separation and reuse: performing gas-liquid separation on an oil-containing mixture produced in step (2) to realize reuse of base oil, circulation of the gas medium, and harmless treatment of the cuttings.

2. The method of claim 1, wherein in step (1), the control of the system viscosity is carried out in the cyclone field, wherein a turbulent flow field in the cyclone field is utilized to promote heat exchange efficiency between the gas medium and the oil based mud cuttings, so as to raise liquid temperature, thereby reducing the viscosity.

3. The method of claim 1, wherein in step (1), the control of the viscosity is carried out at an operating temperature ranging from 70° C. to 200° C., depending on the formulation of the oil based mud cuttings, and lower than a rated use temperature of the oil based mud cuttings.

4. The method of claim 1, wherein in step (1), the gas medium includes air, nitrogen, supercritical carbon dioxide gas, hydrogen, dry gas, gas from a low pressure separator, and tail gas from natural gas combustion.

5. The method of claim 1, wherein in step (2), the oil-based mud cuttings particles have the coupled motion of cyclone revolution and particle rotation in the cyclone field; the rotation has a speed of at most 5000 revolutions/second; and a residence time is 2-10 seconds.

6. An apparatus for deoiling of oil-based mud cuttings by cyclone rotation, comprising:
    a gas feeding system (1) and a gas heating system (2) connected to the gas feeding system (1) for heating a gas medium;
    a cyclone separator set (3) connected to the gas heating system (2) for deoiling of waste oil-based mud cuttings by cyclone rotation; and
    a gas-liquid separation and reuse system (4) connected to the cyclone separator set (3) for separating, circulating and reusing an oil-containing mixture exiting an overflow port of the cyclone separator.

7. The apparatus of claim 6, wherein the apparatus further comprises: a conveying system (5-1) connected to the gas heating system (2) for conveying the waste oil-based mud cuttings to be treated; a conveying system (5-2) connected to the cyclone separator set for conveying the waste oil-based mud cuttings which have been treated; and a cuttings tank (6) connected to the conveying system (5-2) for storing the waste oil-based mud cuttings which have been treated.

8. The apparatus of claim 6, wherein the cyclone separator set (3) is a combination of 1-10 cyclone separators in series, and can be connected in parallel in multiple stages depending on treatment load.

9. The apparatus of claim 6, wherein the cyclone separator set (3) is assembled by installing the cyclone separator(s) in a normal arrangement, installing the cyclone separator(s) in an inverted arrangement, or installing the cyclone separators in a combination of a normal arrangement and an inverted arrangement.

* * * * *